May 14, 1929.   A. J. JACOBS   1,713,180
HEIGHT MEASURING DEVICE
Filed June 4, 1925
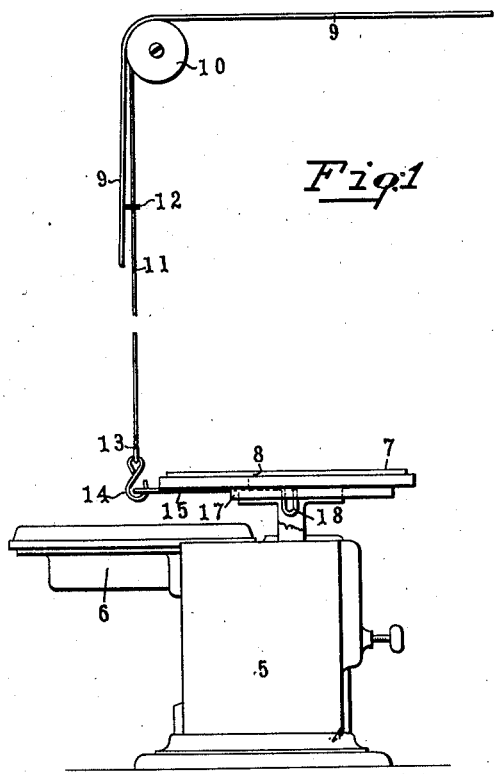
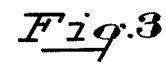
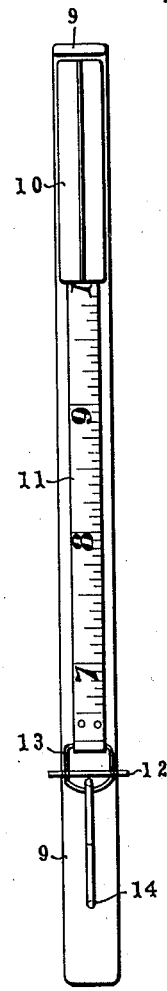
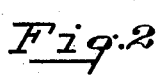
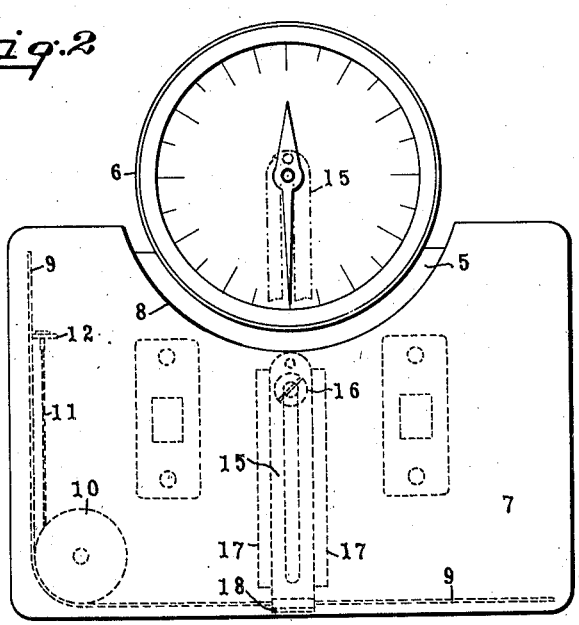
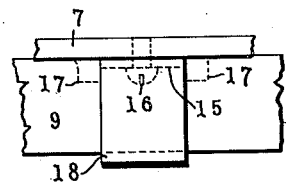
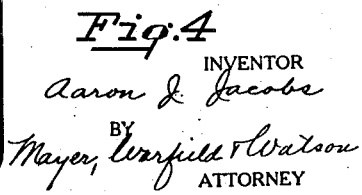

Patented May 14, 1929.

1,713,180

UNITED STATES PATENT OFFICE.

AARON J. JACOBS, OF BROOKLYN, NEW YORK.

HEIGHT-MEASURING DEVICE.

Application filed June 4, 1925. Serial No. 35,000.

This invention relates to a scale attachment, and, more particularly, aims to provide a height-measuring device of improved construction.

It is a primary object to provide a measuring device of this type which may be readily manufactured and utilized, and which attachment, when it is not in use, may be disposed in a position in which it will be inconspicuous and at the same time readily accessible for use.

It is a further object to furnish a compact measuring device by means of which a person may, without assistance, readily measure his own height, and at the same time may ascertain his weight.

It is an additional object to provide a device of the type stated which may be employed to advantage independently of a scale.

With these and further objects in mind, the invention accordingly comprises the features of construction, combination of elements, and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawings, in which:

Fig. 1 is a side elevation of a so-called bathroom type of scale and showing one improved form of measuring device operatively associated therewith;

Fig. 2 is a plan view of the scale illustrating in dotted lines the stowed or inoperative position of the height-measuring device;

Fig. 3 is a detailed illustration of this latter device; and

Fig. 4 is an enlarged fragmentary view of a portion of the scale and showing the member which is employed to associate the measuring device therewith.

In these several views it will be observed that the height-measuring device has, as aforestated, been shown in association with a scale commonly known as the "bathroom type", and merely a single form of measuring device has been illustrated. It is here to be understood that the device, although preferably employed in this particular association, may be utilized by itself or employed in connection with a different type of scale, and also that the construction of the same may be modified as may be deemed best by the manufacturer.

Referring primarily to the scale, it will be noted that the numeral 5 indicates the body thereof, which acts as a support and houses the scale mechanism, and 6 indicates the dial housing. Operatively connected with the mechanism within the body of casing 5, and also suitably associated with the registering mechanism of the scale, is a platform 7, which in the usual manner may be formed with a recessed or bowed central edge-portion 8, as in Fig. 2.

Referring now to the construction of the measuring device it will be observed that a rightangle member 9 is employed, and at the juncture of the arms of this member a tape housing 10 is secured. This latter element, if desired, may be conventional in all respects, and encloses the major portion of a tape 11, which under the influence of a spring (not shown) normally tends to remain within the housing 10. It will also be observed that a slotted lug 12 extends from the inner face of one of the arms of the member 9, and the body of the tape is threaded through this lug and has a link 13 secured to its outer end, it being noted that in the present instance a hook-member 14 is carried by this link. Thus, the tape is prevented from being retracted within the housing beyond a predetermined point, in that the hook will abut against the lug, and the further purposes of the hook 14 will be hereinafter more particularly brought out. Also, the tape will at all times be guided by the lug so that its body will extend substantially parallel to the downwardly-projecting arm of the member 9.

Now with a view to providing means whereby the measuring device may be carried by the scale in operative position it will be observed that in the present instance a slide is associated with the lower face of the platform 7. This slide may simply include a plate or strip 15 formed with a longitudinally-extending slot through which the shank of a screw 16 projects, the latter being affixed to the under side of the platform; the movements of the strip being suitably confined by the use of guide-strips or members 17 also associated with the lower platform face. In the present instance one end of this strip is bent to provide a hook 18, the depth of which is equal to, or slightly in excess of, the width of one of the arms of the member 9. As a consequence, with the strip in the position indicated in dotted lines in Fig. 2, this member may have its body brought to a position at which it lies adjacent the under face of the platform, and one of its arms may be brought to a position so that its body will be accommodated by the hook end of the strip, as has also been indicated in dotted lines.

In such position it will be noted that the entire measuring device is concealed so that the scale will present a neat and clean-cut appearance. On the other hand, however, by simply grasping the outer arm of the member 9 and exerting a pull, the measuring device will immediately become detached from the platform and be rendered available for use.

In such use it will be apparent that it will only be necessary to connect the free end of the tape with the platform, in the present instance, by introducing the hook 14 into the opening formed in the inner end of the strip 15 after projecting the latter to the position indicated in dotted lines in Fig. 2, or in full lines in Fig. 1. The user will now stand upon the scale and by simply looking downward, as in the usual manner, will be able to observe his weight. Grasping the downwardly-extending arm or any other suitable portion of the member 9 he may also ascertain his exact height by resting the horizontally-extending arm of this member upon the top of his head, which will bring the lug 12 into a plane substantially equal to that occupied by his eyes. The further functions of this lug will now become apparent in that the same serves as a pointer or indicating member registering with the graduations of the scale appearing on the tape 11, and the height may thus be accurately read. At this time it will be observed that the tape, instead of beginning with the usual zero graduation, begins, in the present embodiment, at approximately the 6¼" graduation. This is due to the fact that the distance between the lug 12 and the housing 10, and also, the distance between the inner end of the slide 15 and the lower end of the tape must be allowed for.

It will also be appreciated that by anchoring one end of the tape or other measuring device utilized to the platform the correct height of the person standing thereon will be measured irrespective of the amount of movement of the platform, in view of the fact that the tape will move with the same.

From the foregoing it will be appreciated that the objects of this invention have been accomplished, and since certain changes may be made in the above construction, and different embodiments of the invention could be made, without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. A measuring device, including, in combination, a member having two arms extending at substantially right angles to each other, a tape housing associated with said member adjacent the juncture of said arms, a tape within said housing and a slotted lug carried by one of said arms and through the slot of which said tape is extended, the end of said tape being adapted for attachment to the platform of a scale.

2. A measuring device, including a pair of arms disposed at substantial right angles to each other, a tape housing associated with said arms, a tape within and extensible beyond said housing, one of said arms being contactible with the head of the person whose height is to be measured, the second of said arms being adapted to extend in front of the face of such person, and means carried by said latter arm and registering with the graduations of said tape for indicating the height of such person the end of said tape being intended to be attached to the platform of a scale.

3. A measuring device, including, in combination, two arms extending substantially at right angles to each other, a measuring tape housing associated with said arms, a tape within and extensible beyond said housing, one of said arms being adapted to be grasped by the hand of the person whose height is to be measured, the other of said arms being adapted to overlie the head of such person, and registering means cooperating with the graduations whereby the same may be read in order to ascertain the measured height the end of said tape being intended to be attached to the platform of a scale.

4. In combination, a scale presenting a movable platform, a flexible graduated member having one of its ends connected to said platform and movable therewith, and a contact element fixedly associated with the opposite end of said graduated member.

5. In combination, a scale presenting a movable platform, a flexible graduated member, means for detachably connecting said member with said platform, and a contact element fixedly associated with the upper end of said graduated member and adapted to be engaged with an object to be measured.

6. In combination, a scale presenting a movable platform, a flexible graduated member adapted for detachable association with said platform, a contact element fixedly associated with the upper end of said graduated member, and means carried by said element and adapted to register with the graduations of said member.

7. In combination, a scale having a movable platform, a height-measuring member extensible above said platform and connectible therewith, and means associated with said platform for retaining said member below the same when in inoperative condition.

8. In combination, a scale having a movable platform, a height-measuring member extensible above said platform and connectible therewith, and means associated with said platform for optionally retaining said measuring member in position adjacent said platform or detachably connecting the lower end of said measuring member with said platform.

9. In combination, a scale, a platform forming a part of the same, a coiled tape, a contact device associated therewith, means for detachably securing said tape to the scale platform and means associated with the platform and engageable with said contact device for retaining the same.

10. In combination, a scale, a platform forming a part of the same, a pair of bars disposed at an angle to each other, a tape housing mounted at the juncture of said bars, a measuring tape extending therefrom and adjacent one of said bars, means associated with said bar and registering with the graduations of said tape, the other of said bars constituting a contact element, means on the under side of said platform to engage one of said bars to retain the same and means for detachably connecting the end of the tape to said platform.

In testimony whereof I affix my signature.

AARON J. JACOBS.